(12) United States Patent
Inaba et al.

(10) Patent No.: US 12,168,439 B2
(45) Date of Patent: Dec. 17, 2024

(54) VEHICLE CONTROL DEVICE, AND VEHICLE CONTROL SYSTEM

(71) Applicant: Hitachi Astemo, Ltd., Hitachinaka (JP)

(72) Inventors: Ryoh Inaba, Tokyo (JP); Trongmun Jiralerspong, Tokyo (JP); Hidehiro Toyoda, Hitachinaka (JP)

(73) Assignee: Hitachi Astemo, Ltd., Ibaraki (JP)

( * ) Notice: Subject to any disclaimer, the term of this patent is extended or adjusted under 35 U.S.C. 154(b) by 198 days.

(21) Appl. No.: 17/783,532

(22) PCT Filed: Nov. 20, 2020

(86) PCT No.: PCT/JP2020/043333
§ 371 (c)(1),
(2) Date: Jun. 8, 2022

(87) PCT Pub. No.: WO2021/124794
PCT Pub. Date: Jun. 24, 2021

(65) Prior Publication Data
US 2023/0021615 A1    Jan. 26, 2023

(30) Foreign Application Priority Data
Dec. 16, 2019  (JP) ................................. 2019-226274

(51) Int. Cl.
*B60W 30/14* (2006.01)
*B60W 10/18* (2012.01)
(Continued)

(52) U.S. Cl.
CPC .......... *B60W 30/146* (2013.01); *B60W 10/18* (2013.01); *B60W 30/09* (2013.01);
(Continued)

(58) Field of Classification Search
CPC .... B60W 30/146; B60W 10/18; B60W 30/09; B60W 30/0956; B60W 30/18127; B60W 40/04; B60W 2554/402; B60W 2556/40
See application file for complete search history.

(56) References Cited

U.S. PATENT DOCUMENTS

2004/0206570 A1* 10/2004 Tajima ................... B62D 6/002
                                                              701/41
2015/0307100 A1* 10/2015 Shimizu .............. B60W 40/109
                                                              701/96
(Continued)

FOREIGN PATENT DOCUMENTS

JP    2011-116218 A    6/2011
JP    2011-242860 A    12/2011
(Continued)

OTHER PUBLICATIONS

International Search Report for Application No. PCT/JP2020/04333, dated Feb. 22, 2021. 2pages.

*Primary Examiner* — Hussein Elchanti
(74) *Attorney, Agent, or Firm* — Volpe Koenig

(57) ABSTRACT

A vehicle control device that autonomously controls a vehicle so as not to cause rapid deceleration that leads to a deterioration in ride quality. The vehicle control device controls first and second deceleration, means that reduce a speed at a deceleration rate large than a deceleration rate of the first deceleration means. The vehicle control device includes a blind spot area detecting unit that detects a blind spot area of a sensor that recognizes an external environment, and a blind spot object estimating unit that estimates a blind spot object that is a virtual moving body hidden in the blind spot area. When a vehicle approaches the blind spot area at a speed reduced by the first deceleration means, the vehicle is decelerated by the second deceleration means (Continued)

when a type of a moving body detected by the sensor is different from a type of the blind spot object.

7 Claims, 12 Drawing Sheets

(51) Int. Cl.
  *B60W 30/09* (2012.01)
  *B60W 30/095* (2012.01)
  *B60W 30/18* (2012.01)
  *B60W 40/04* (2006.01)

(52) U.S. Cl.
  CPC .. *B60W 30/0956* (2013.01); *B60W 30/18127* (2013.01); *B60W 40/04* (2013.01); *B60W 2554/402* (2020.02); *B60W 2556/40* (2020.02)

(56) References Cited

U.S. PATENT DOCUMENTS

| | | | |
|---|---|---|---|
| 2016/0039412 A1* | 2/2016 | Stählin | B60T 8/17 701/41 |
| 2016/0334230 A1* | 11/2016 | Ross | G05D 1/0027 |
| 2017/0018179 A1* | 1/2017 | Gutierrez | G08G 1/096791 |
| 2017/0262709 A1* | 9/2017 | Wellington | G06V 10/764 |
| 2018/0059779 A1* | 3/2018 | Sisbot | G06T 19/20 |
| 2018/0204398 A1* | 7/2018 | Smith | G07C 5/0808 |
| 2018/0349784 A1* | 12/2018 | Zheng | G06F 18/217 |
| 2019/0106104 A1 | 4/2019 | Inoue et al. | |
| 2019/0163176 A1* | 5/2019 | Wang | G05D 1/0027 |
| 2021/0020048 A1* | 1/2021 | Perko | G08G 1/096758 |

FOREIGN PATENT DOCUMENTS

| | | |
|---|---|---|
| JP | 2017-114405 A | 6/2017 |
| JP | 2019-069659 A | 5/2019 |

* cited by examiner

VEHICLE CONTROL DEVICE, AND VEHICLE CONTROL SYSTEM

TECHNICAL FIELD

The present invention relates to a vehicle control device and a vehicle control system that control a vehicle, such as an automobile.

BACKGROUND ART

As a conventional technique for achieving driving assist that takes into consideration a potential risk of collision with a pedestrian hidden at a blind spot of an obstacle near a user's vehicle, a driving assist apparatus described in PTL 1 is known.

For example, the abstract of PTL 1 describes a driving assist apparatus "which includes a calculation means that when an object creating a blind spot is present in front of a user's vehicle, calculates a standard speed that the user's vehicle should adopt to avoid a collision between a virtual moving body assumed to be present at the blind spot of the object and the user's vehicle; an estimating means that estimates a risk level concerning a road on which the user's vehicle is traveling, based on environmental information indicating a traveling environment related to the user's vehicle; and a correction means that corrects the calculated standard speed, based on the estimated risk level". In addition, paragraph 0040 of the specification of PTL 1 includes the following statement: "A risk level estimating unit 12 also extracts one or a plurality of pieces of information (i.e., near miss cases) corresponding to the estimated road environment and traffic environment, based on tag information added to each of a plurality of pieces of information included in a near miss database. The risk level estimating unit 12 estimates the risk level by comprehensively taking into consideration the estimated road environment and traffic environment and one or a plurality of pieces of the extracted information".

In this manner, a method of achieving safer autonomous driving has been developed, by which method, in a road environment where a blind spot is present, such as a residential area, the type of a virtual moving body hidden at the blind spot is estimated based on near miss data, and the virtual moving body's bolting out is predicted.

CITATION LIST

Patent Literature

PTL 1: JP 2019 069659 A

SUMMARY OF INVENTION

Technical Problem

The concept of PTL 1 is to calculates the standard speed that the user's vehicle should adopt to avoid a collision between the virtual moving body assumed to be present at the blind spot of the object and the user's vehicle, to estimate by the estimating means the risk level concerning the road on which the user's vehicle is traveling, based on environmental information indicating the traveling environment related to the user's vehicle, and to correct the calculated standard speed, based on the estimated risk level, and travel through the surrounding area of the blind spot at the corrected speed.

According to this concept, however, when the estimated risk level is incorrect, such as a case where a moving body actually bolting out from the blind spot is different from the estimated moving body, rapid deceleration may be required to cope with the actual situation, in which case a ride quality may deteriorate.

An object of the present invention is to provide a vehicle control device that even when estimation of a risk level is incorrect, can carry out autonomous driving control in such a way as not to cause rapid deceleration that leads to a deterioration in a ride quality.

Solution to Problem

A vehicle control device according to the present invention controls a first deceleration means and a second deceleration means that reduce a speed at a deceleration rate large than a deceleration rate of the first deceleration means. The vehicle control device includes: a blind spot area detecting unit that detects a blind spot area of a sensor that recognizes an external environment; and a blind spot object, estimating unit that estimates a blind spot object that is a virtual moving body hidden in the blind spot area. When a vehicle approaches the blind spot area at a speed reduced by the first deceleration means, the vehicle is decelerated by the second deceleration means when a type of a moving body detected by the sensor is different from a type of the blind spot object.

Advantageous Effects of Invention

According to the vehicle control device of the present invention, even when estimation of the risk level, is incorrect, autonomous driving control can be carried out in such a way as not to cause rapid deceleration that leads to a deterioration in the ride quality. Other configurations, operations, and effects of the present invention will be described in detail in the following embodiments.

DESCRIPTION OF EMBODIMENTS

Figure 1:
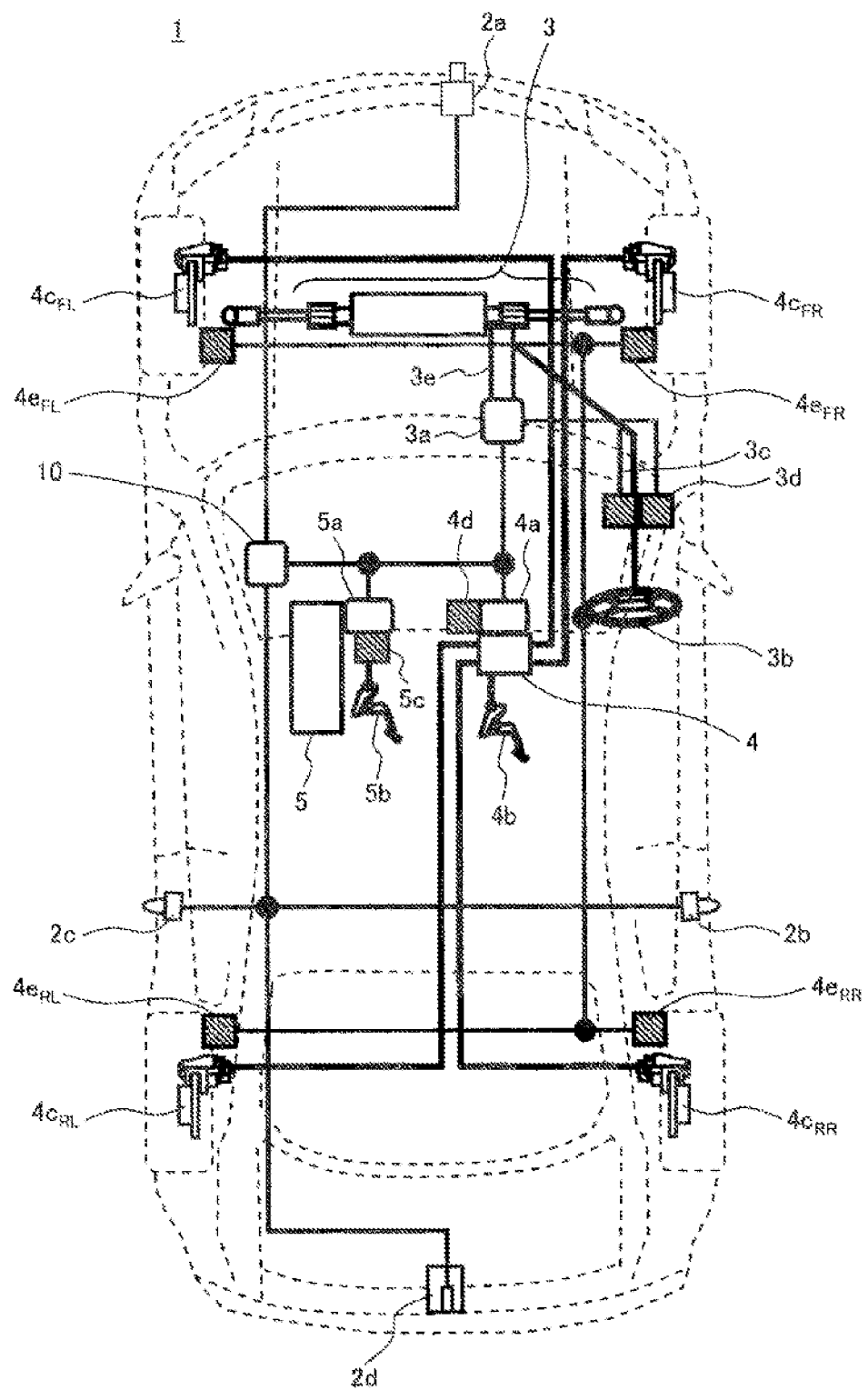
FIG. 1 is a schematic diagram showing an overall configuration of a user's vehicle.

FIG. 1 is a schematic diagram showing an overall configuration of a user's vehicle 1 equipped with a vehicle control device 10 according to an embodiment of the present invention. In FIG. 1, FL is a symbol denoting a constituent element corresponding to a left front wheel, FR is a symbol denoting a constituent element corresponding to a right front wheel, RL is a symbol denoting a constituent element corresponding to a left rear wheel, and RR is a symbol denoting a constituent element corresponding to a right rear wheel.

First, in the configurations shown in FIG. 1, some constituent elements are pointed out as constituent elements that are particularly important for embodying the present invention. These constituent elements include sensors 2 (2a to 2d), a steering control mechanism 3, a steering control device 3a, a brake control mechanism 4, a brake control device 4a, an accelerator control mechanism 5, an acceleration control device 5a, and a vehicle control device 10.

Based on information from the sensor 2 that recognizes an external environment, the vehicle control device 10 calculates instruction values sent respectively to the steering control device 3a that controls the steering control mechanism 3, the brake control device 4a that controls the brake control mechanism 4, and the acceleration control device 5a that controls the accelerator control mechanism 5. The vehicle control device 10 is, specifically, a computer including a CPU, a ROM, a RAM, and an input/output device. The ROM stores programs for implementing various functions, which will be described later, and the CPU executes a program loaded from the ROM onto the RAM, thus implementing an intended function. Each of the steering control device 3a, the brake control device 4a, and the acceleration control device 5a is too a computer similar in configuration to the computer serving as the vehicle control device 10. FIG. 1 shows the configuration in which the control devices are in distributed arrangement. However, a different configuration may be adopted in which a single computer implements functions of individual control devices.

The sensors 2, which recognize the external environment, include, for example, a camera 2a disposed on the front of the user's vehicle 1, laser radars 2b and 2c disposed on left and right sides, and a millimeter wave radar 2d disposed on the rear. Based on output from these camera and radars, the vehicle control device 10 detects a relative distance and a relative speed between the user's vehicle 1 and a vehicle near the user's vehicle 1. The sensors 2 are not limited to the above-described cameras or the like, and may be, for example, different types of sensors, such as an ultrasonic sensor, a stereo camera, and an infrared camera.

A configuration related to the steering control mechanism 3 will then be described. When the driver (user) drives the user's vehicle 1, the steering torque detecting device 3c and the steering wheel angle detecting device 3d detect a steering torque and a steering wheel angle, respectively, which result when the driver operates a steering wheel 3b. Based on detection information indicative of these steering torque and steering wheel angle, the steering control device 3a controls an assist motor 3e to cause it to generate an assist torque. Then, a force created by adding up the steering torque applied by the driver and the assist torque generated by the assist motor 3e puts the steering control mechanism 3 into operation, which sets the front wheels in an intended direction. Meanwhile, in accordance with a turning angle of the front wheels, a reaction force from the road, surface is transmitted to the steering control mechanism 3 and is further transmitted to the driver, as a road surface reaction.

The steering control device 3a generates an assist torque by the assist motor 3e, independently of a steering operation by the driver, thus being able to control the steering control mechanism 3. The vehicle control device 10, therefore, can control the front wheels to any given turning angle by transmitting a steering force instruction to the steering control device 3a, and assumes a role of performing autonomous steering in autonomous driving mode in which the driver's operation does arise. It should be noted, however, that in this embodiment, a different actuator, such as a steer-by-wire, may be used in place of the steering control device of the above-described configuration.

A configuration related to the brake control mechanism 4 will then be described. When the driver drives the user's vehicle 1, a stepping force with which the driver steps on a brake pedal 4b is boosted by a brake booster (not illustrated), and a hydraulic pressure corresponding to the boosted stepping force is generated by a master cylinder (not illustrated). The generated hydraulic pressure is supplied to respective wheel cylinders 4c ($4c_{FL}$ to $4c_{RR}$) of the wheels via the brake control mechanism 4. Each wheel cylinder 4c is composed of a cylinder (not illustrated), a piston, a pad, and the like. A hydraulic fluid supplied from the master cylinder propels the piston, which presses the pad connected to the piston against a disk rotor. Because the disk rotor rotates together with the wheel, a brake torque acting on the disk rotor serves as a braking force acting between the wheel and the road surface. Through the above process, in accordance with the driver's operating the brake pedal, a braking force is generated at each wheel by a mechanical brake mechanism.

The brake control device 4a receives input of longitudinal acceleration, horizontal acceleration, and a yaw rate that are detected by a combine sensor 4d, of wheel speeds detected by wheel speed sensors 4e ($4e_{FL}$ to $4e_{FR}$) set respectively on the wheels, of a braking force instruction from the vehicle control device 10, and a steering wheel angle signal from the steering wheel angle detecting device 3d. The brake control device 4a is connected to the brake control mechanism 4 having a pump (not illustrated) and a control valve, and can generate any given braking force at each wheel, independently of the driver's operating the brake pedal. The brake control device 4a assumes a role of estimating the spin, drift-out, and lock of a wheel of the vehicle, based on the above input information, and generating a braking force to the wheel, the braking force suppressing the spin, drift-out, and lock of the wheel, to enhance the stability of the driver's driving. In addition, the vehicle control device 10 can generate any given braking force acting on the vehicle, by transmitting a braking instruction to the brake control device, thus assuming a role of performing autonomous braking in autonomous driving mode in which the driver's operation does not arise. It should be noted, however, that in this embodiment, a different actuator, such as a brake-by-wire, may be used in place of the brake control device of the above-described configuration.

A configuration related to the accelerator control mechanism 5 will then be described. When the driver drives the user's vehicle 1, an amount of the driver's stepping on an accelerator pedal 5b of is detected by a stroke sensor 5c and is inputted to the acceleration control device 5a. The acceleration control device 5a adjusts a degree of opening of a throttle according to the amount of stepping on the accelerator pedal, thereby controlling the engine. Through the above process, the vehicle can be accelerated according to the driver's operating the accelerator pedal. In addition, the acceleration control device 5a can control the degree of opening of the throttle, independently of the driver's operating the accelerator. The vehicle control device 10, therefore, can cause acceleration of any given magnitude on the vehicle by transmitting an acceleration instruction to the acceleration control device 5a, and assumes a role of performing autonomous acceleration in autonomous driving mode in which the driver's operation does arise. When the user's vehicle 1 is a so-called electric vehicle that uses not an engine but a motor, the acceleration control device 5a controls power output from the motor.

<Vehicle Control Device 10>

Figure 2:
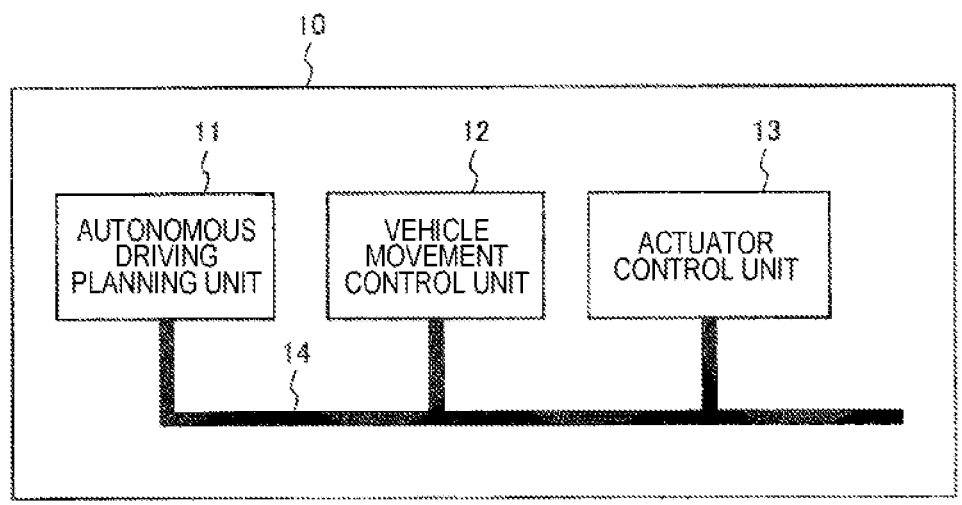
FIG. 2 is a block diagram showing a configuration of a vehicle control device.

A configuration of the vehicle control device 10 will then be described with reference to a block diagram of FIG. 2. As shown in FIG. 2, the vehicle control device 10 includes an autonomous driving planning unit 11 that plans an operation for autonomously driving the user's vehicle 1 to a destination, a vehicle movement control unit 12 that generates an instruction value for controlling movement of the user's vehicle 1, an actuator control unit 13 that controls individual actuators, such as the engine, the brake, and the steering, and a wired or wireless vehicle network 14 that connects the control units. Each of these units will hereinafter be described in detail.

<Autonomous Driving Planning Unit 11>

A configuration of the autonomous driving planning unit 11 will first be described with reference to a block diagram of FIG. 3.

Figure 3:
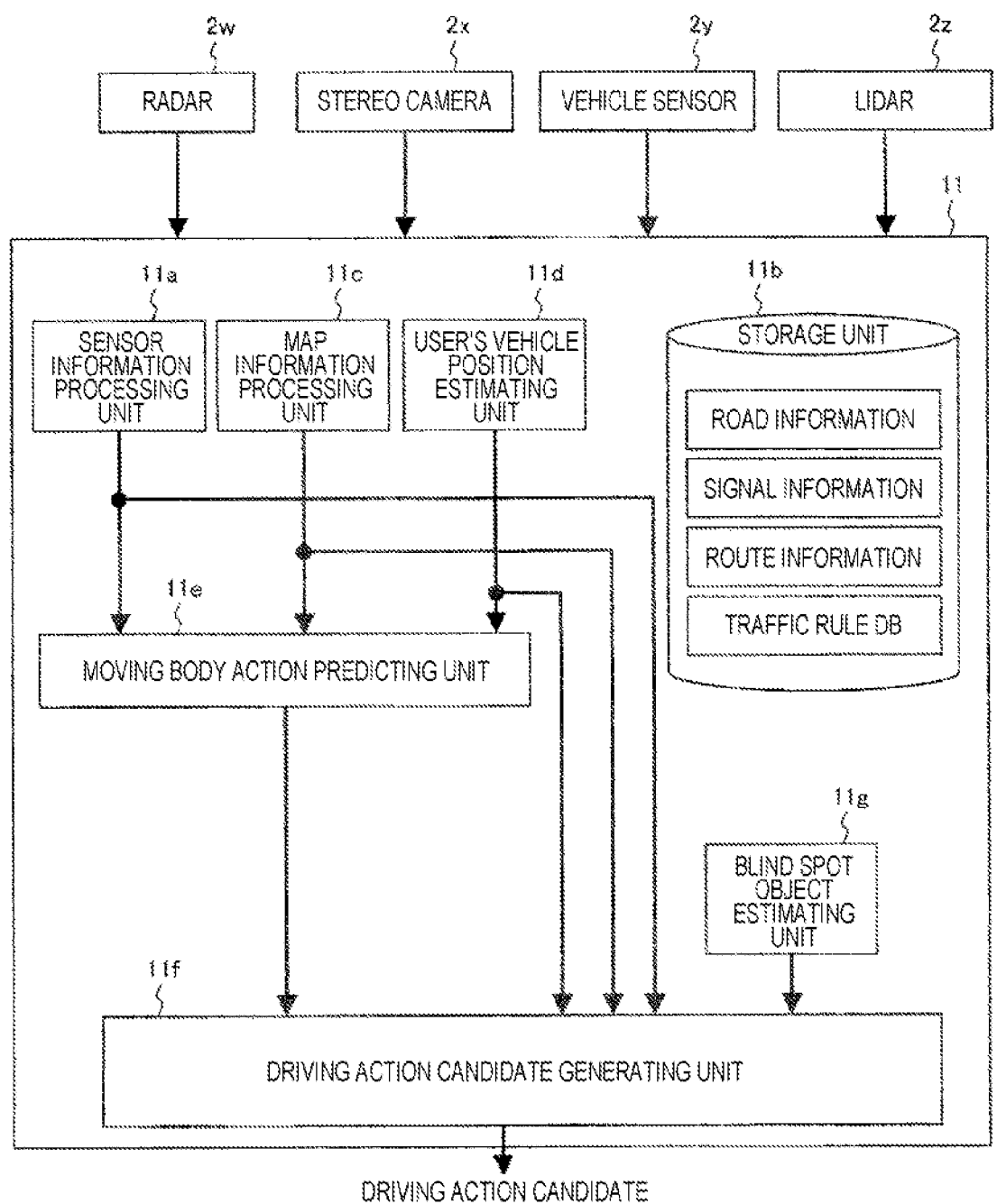
FIG. 3 is a block diagram showing a configuration of an autonomous driving planning unit.

As shown in FIG. 3, the autonomous driving planning unit 11 includes a sensor information processing unit 11a, a storage unit 11b, a map information processing unit 11c, a user's vehicle position estimating unit 11d, a moving body action predicting unit 11e, a driving action candidate generating unit 11f, and a blind spot object estimating unit 11g. To the autonomous driving planning unit 11, a radar 2w, a stereo camera 2x, a vehicle sensor 2y, a LiDAR 2z, and the like are connected, as sensors 2 that recognize the external environment.

The radar 2w is a sensor that emits a radio wave toward an object and that measures a reflected wave from, the object to measure a distance and a direction to the object. The stereo camera 2x is a sensor that simultaneously photographs an object from a plurality of different directions, thus being able to record information on the depth of the object. The vehicle sensor 2y is a group of sensors that can detect vehicle state information, such as information from a sensor that measures the speed of the vehicle and the number of revolutions of tires, information on the average position of the user's vehicle 1 that is calculated by using a global navigation satellite system (GNSS), destination information that, an occupant of the user's vehicle 1 inputs, using a navigation system as an interface, and destination information that an operator or the like in a remote place specifies, using wireless communication means, such as a mobile phone line. The LiDAR 2z is a sensor that measures scattered light resulting from emission of pulses of laser beam to detect a distance to an object in a distant place.

Surrounding environment information, which is obtained based on information output from the sensors 2, is inputted to the sensor information processing unit 11a, where the inputted information is converted, into object information on a moving body present around the user's vehicle 1. Specific examples of the object information include information indicating attributes (type) of a moving body, such as a pedestrian, a bicycle, or a vehicle, and information indicating a current position and a current speed vector of the moving body. It should be noted that moving bodies include an object that, although currently in a stationary position, may move in the future (e.g., a parked vehicle or the like).

The storage unit 11b stores road information and traffic light information on a section from an autonomous driving start point to a target point, route information on a section from a current position to the target point, and a database of traffic rules applied to a section where the user's vehicle 1 travels. The storage unit 11b stores also a point cloud database used by the user's vehicle position estimating unit 11d, which will be described later.

The map information processing unit 11c arranges lighting information and the like on traffic lights the user's vehicle 1 is scheduled to pass, into a usable form, based on traffic lane center line information and traffic light information on the road, the information being necessary for autonomous driving.

The user's vehicle position estimating unit 11d estimates a location where the user's vehicle 1 is present, based on surrounding environment information obtained by the sensors 2, the point cloud database stored in the storage unit 11b, a steering angle of the vehicle, a vehicle speed, information obtained by the GNSS, and the like.

The moving body action predicting unit 11e receives input information outputted from the sensor information processing unit 11a, the map information processing unit 11c, and the user's vehicle position estimating unit 11d, and based on these pieces of input information, calculates/predicts the future position and speed of each moving body. For example, to calculate/predict a position $R\ (X_T, Y_T)$ at future time T on the basis of a current position $R\ (X_0, Y_0)$ and a current speed $V\ (Vx_0, Vy_0)$, which is current object information on a certain moving body, the following linear prediction equation (Equation 1) is used,

[Equation 1]

$$R(X_T, Y_T) = V(Vx_0, Vy_0) \times T + R(X_0, Y_0) \quad \text{(Equation 1)}$$

This predictive calculation method is simple one by which the future position of each moving body is calculated/predicted on the assumption that the moving body makes a constant speed linear movement with its current speed maintained, Requiring a small calculation load, this predictive calculation method allows execution of predictive calculations on many moving bodies in a short time.

The driving action candidate generating unit 11f receives output from the sensor information processing unit 11a, from the man information processing unit 11c, from the user's vehicle position estimating unit 11d, from the moving body action predicting unit 11e, and from the blind spot object estimating unit 11g, which will be described later. In this case, a driving action candidate is calculated based on route information and a current vehicle state (speed, position, orientation, etc.) so chat the user's vehicle 1 does not collide with a moving body nearby, such as a different vehicle. The driving action candidate refers to a candidate of a driving action in which the user's vehicle 1 does not collide with a different vehicle or a moving body nearby and can stop or travel, based on the route information and the current vehicle state (speed, position, orientation, etc.).

<Processes by Blind Spot Object Estimating Unit 11g>

Processes by the blind spot object estimating unit 11g will then be described with reference to a flowchart of FIG. 4.

First, at step S11g-1, the blind spot object estimating unit 11g acquires various pieces of information necessary for estimating a blind spot object 52, which is a virtual moving body (pedestrian, bicycle, different; vehicle, etc.) hidden in a blind spot area 51 of an obstacle nearby. Specifically, road information and map information are acquired from the storage unit 11b, and detection information is acquired from each sensor.

Figure 5:
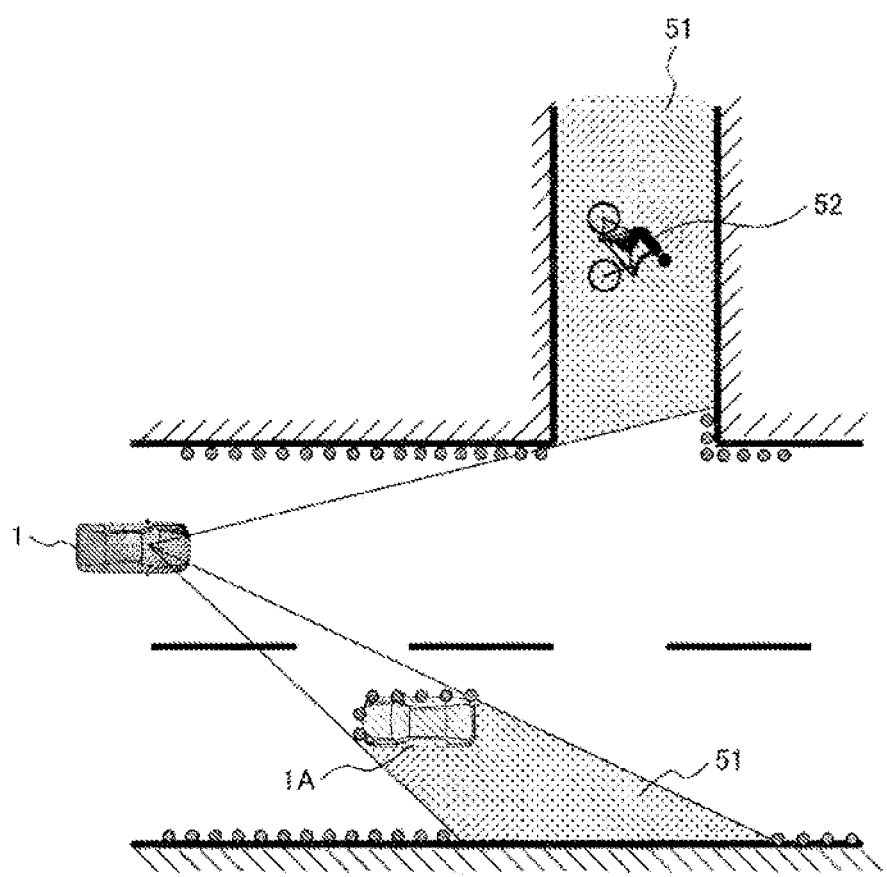
FIG. 5 is a diagram showing an example of blind spot areas present around the user's vehicle.

Subsequently, at step S11g-2, the blind spot object estimating unit 11g detects the blind spot area 51 near the user's vehicle, based on the acquired various pieces of information. As shown in FIG. 5, the blind spot area 51 is an area that cannot be detected by the sensors 2 of the user's vehicle 1 because of a different vehicle 1A, fences, and edges that are present as obstacles around the user's vehicle 1.

Subsequently, at step S11g-3, for each blind spot area 51 detected at step S11g-2, the blind spot object estimating unit 11g estimates the type and action tendency of the blind spot object 52 that may be hidden in the blind spot area 51.

Methods of estimating the blind spot object 52 includes a method of estimating the type of the blind spot; object 52 on the basis of a feature amount of a road situation extracted from surrounding environment information or map information. For example, the blind spot object 52 can be estimated to be a vehicle, a bicycle, or a pedestrian, by considering various pieces of information, such as the presence or absence of a fence between the road and the sidewalk, a park nearby and a time zone (whether the current time zone is a time zone in which kids play around), the presence or absence of a school zone, the color of a traffic light (red, blinking yellow, etc.), a road sign, a place specified as an accident frequent spot based on past statistical information, a parked vehicle being an ordinary vehicle or an ambulance, a school bus being stopped, an object bolting out from among vehicles in the congested opposite lane, a drive-through counter or entrance of a shop, and the vicinity of the entrance of a supermarket parking lot. Inputting point cloud information and image information obtained from the in-vehicle sensors 2 to a statistical model, such as a neural network, is another method that may be adopted. By this method, the type of the blind spot object 52 is statistically estimated, based on information learned in advance. A method by which only the action tendency of the blind spot object 52 is estimated without estimating its type may also be adopted. Still another method may also be adopted, by which even when the state of the blind spot object 52 is estimated to be stationary, its tendency of random actions is predicted when the blind spot object 52 is estimated to be a child, while its tendency of linear actions is predicted when the blind spot object 52 is estimated to be a vehicle or bicycle. Information on the blind spot object 52 acquired through these estimations is used as blind spot object estimation information at the time of a track candidate generation, which will be described later.

<Processes by Vehicle Movement Control Unit 12>

Figure 6:
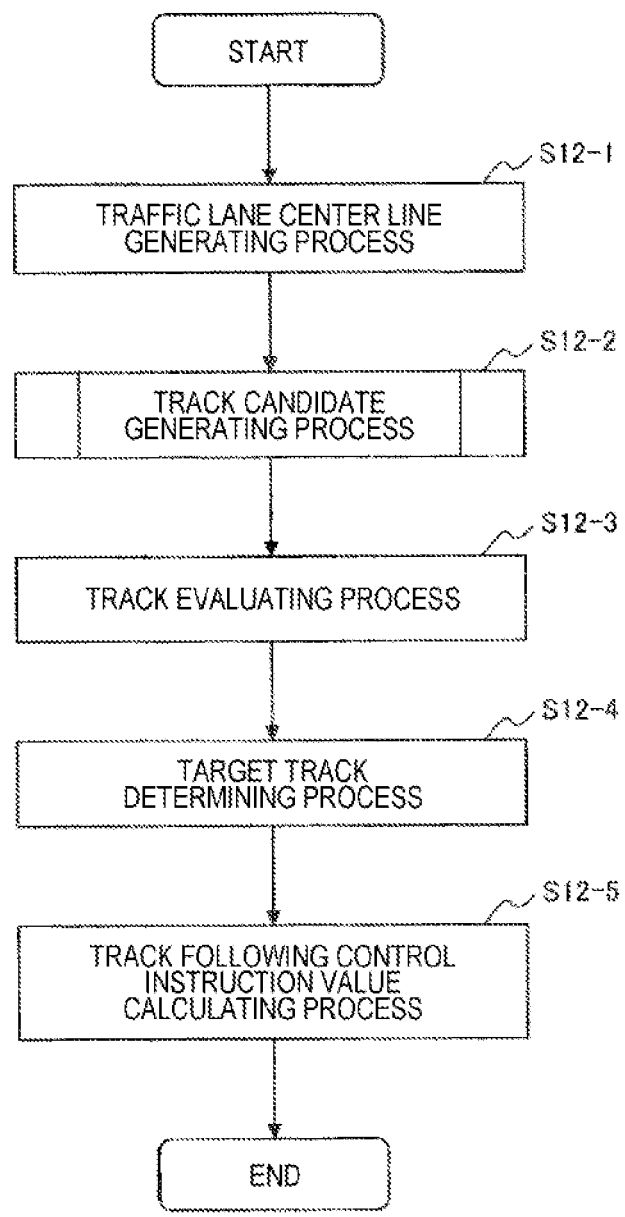
FIG. 6 is a flowchart showing processes executed by a vehicle movement control unit.

Processes by the vehicle movement control unit 12 will then be described with reference to a flowchart of FIG. 6.

The vehicle movement control unit 12 is a control unit that calculates a target value for each actuator during traveling in autonomous driving mode, based on a driving action candidate, map information on the surroundings, user's vehicle position estimation information, and blind spot object estimation information. To calculate the target value of each actuator, the vehicle movement control unit 12 executes the following series of processes.

First, at step S12-1, the vehicle movement control unit 12 generates a traffic lane center line, based on user's vehicle position estimation information acquired by estimation by the user's vehicle position estimating unit 11d and map information on the surroundings acquired from the storage unit 11b. Specifically, this is a process of calculating a center point sequence (which is expressed as latitude/longitude information or plane coordinate information $(X_1, Y_1) \ldots , (X_N, Y_N)$ of a traffic lane on which the user's vehicle 1 travels.

Subsequently, at step S12-2, the vehicle movement control unit 12 generates a track candidate, based on a driving allowed area and map information on the surroundings. The driving allowed area is an area in which the user's vehicle 1 does not collide with a different vehicle or a moving body nearby and is allowed to travel or stop as route information and the current vehicle state (speed, position, orientation, etc.) is taken into consideration.

Figure 7:
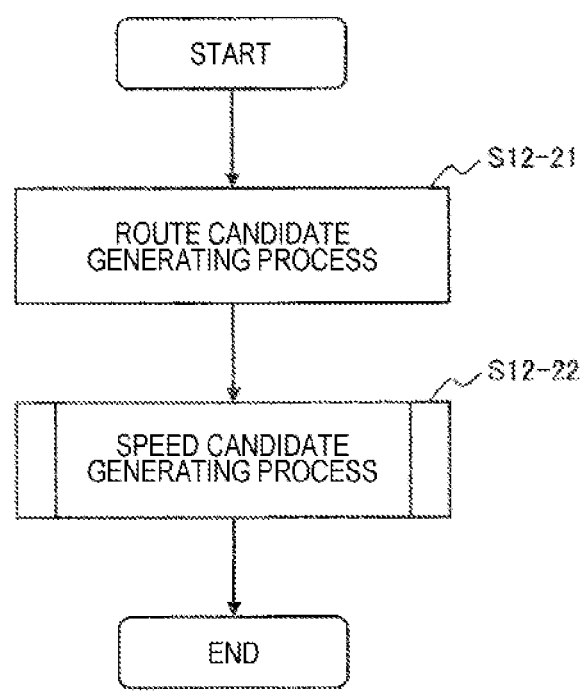
FIG. 7 is a flowchart showing details of a track candidate generating process.

As shown in FIG. 7, this step can be subdivided into step S12-21 of generating a route candidate and step S12-22 of generating a speed candidate.

First, at step S12-21 of generating a route candidate, the vehicle movement control unit 12 calculates a route (a point sequence through which the user's vehicle 1 passes, the point sequence bearing no time-sequence information), based on the driving allowed area and the map information on the surroundings. For example, in the driving allowed area, a route candidate satisfying the following variational equation (Equation 2) is generated.

[Equation 2]

$$Min. \int_{t_1}^{t_2} \left[ w_1 \left( \begin{array}{c} \text{Horizontal acceleration} \\ \text{of user's vehicle} \end{array} \right)^2 + w_2 \left( \begin{array}{c} \text{Extent of separation} \\ \text{from target traffic line} \end{array} \right)^2 + w_3 \left( \begin{array}{c} \text{Angle of vehicle head against tangent} \\ \text{to traffic line centerline} \end{array} \right)^2 \right] dt \quad \text{(Equation 2)}$$

Now, as a method of calculating a future state of movement of the user's vehicle 1, a method of using a plant model of the user's vehicle 1 may be adopted. For example, a bicycle model, a four-wheel model, or the like may be used as a plant model. In this manner, behavior that the user's vehicle 1 shows when traveling on the route candidate calculated by Equation 2 (longitudinal acceleration, horizontal acceleration, vehicle head angle, and the like of the user's vehicle 1) can be obtained from the plant model. Similarly, at step S12-22 of generating a speed candidate, future vehicle behavior is predicted, using the same plant model.

Changing respective weights ($w_1$, $w_2$, $w_3$) of the coefficients of Equation 2 or changing evaluation items allows generation of a plurality of route candidates. A method not using Equation 2 may also be adopted, by which a lane center point sequence of a traffic lane where the user's vehicle travels in the driving allowed area may be used as the route candidate.

Subsequently, at step S12-22 of generating a speed candidate, for each of route candidates generated, the vehicle movement control unit 12 calculates a speed candidate for a speed with which the user's vehicle 1 passes through the surrounding area of the blind spot area 51, by processes shown in FIG. 8.

Figure 9:
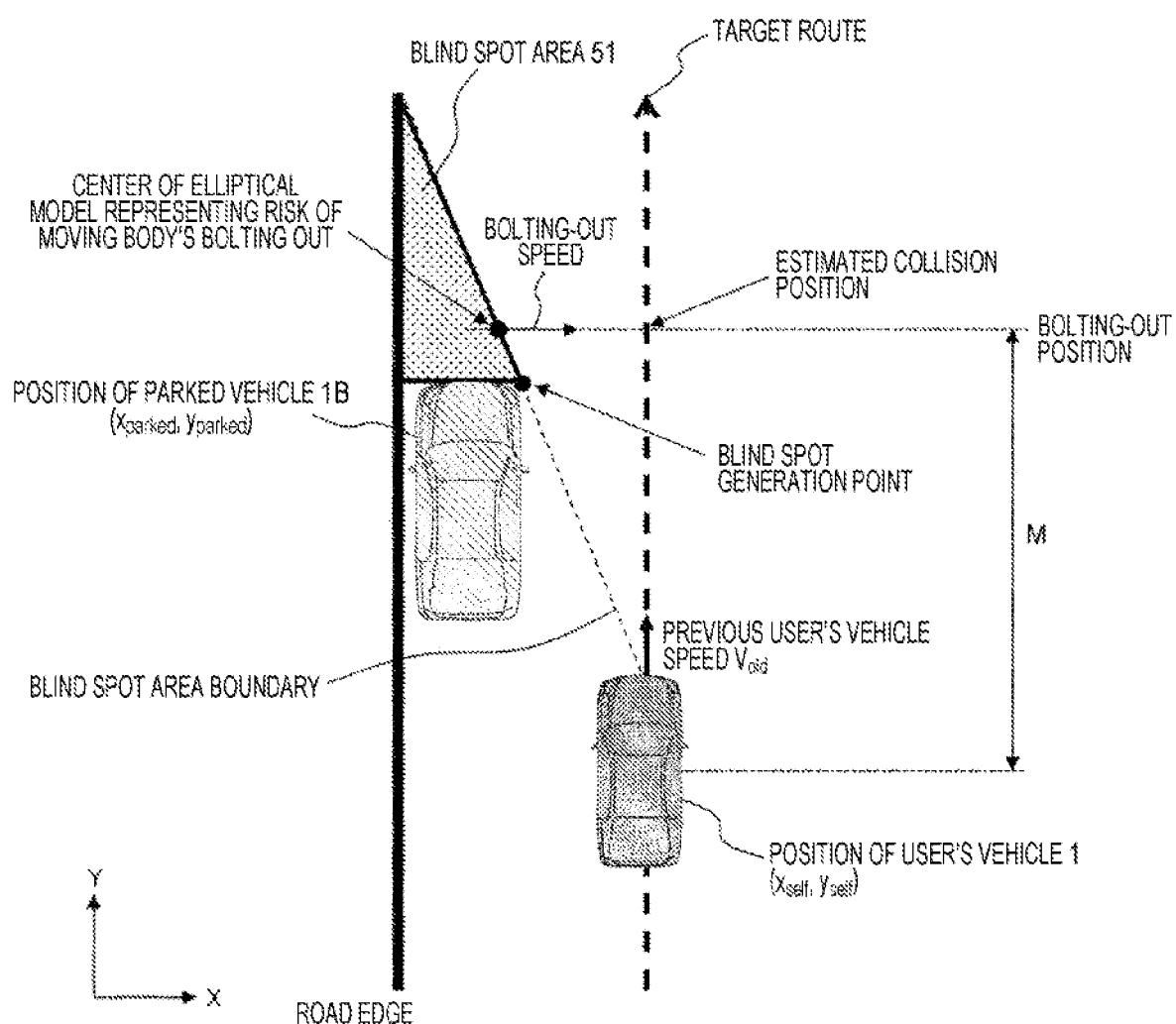
FIG. 9 is a diagram for explaining a method of calculating a standard speed in a case where a blind spot area is present.

First, at step S12-22a, the vehicle movement control unit 12 calculates a standard speed with which the user's vehicle 1 passes through the blind spot area 51, based on blind spot object estimation information. Now a method of calculating a standard speed to be adopted in a situation shown in FIG. 9 will be described. Hereinafter, a potential risk posed by the blind spot object 52 is expressed as an elliptical model. A method of calculating the potential risk expressed as the elliptical model includes the following three steps A to C.

At the first step A, a time the user's vehicle takes to reach a bolting-out position is determined. Specifically, a time ($T_{self}$ [sec]) the user's vehicle 1 takes to reach a position (bolting out position) at which a moving body may possibly bolts out from a blind spot of a parked vehicle 1B is calculated, using Equation 3. The center of the elliptical model representing the risk of the blind spot object 52 bolting out is estimated, based on surrounding environment information on the object creating the blind spot (parked vehicle 1B), for example, on information indicating the presence of a side road in the blind spot area or information indicating the presence of a traffic lane behind.

[Equation 3]

$$T_{self} = \int_0^M \frac{dx}{V_{old}(t)}$$ (Equation 3)

In Equation 3, $V_{old}$ (t) denotes a speed profile planned at the previous sampling time, and M denotes a distance to an estimated collision position.

At the next step B, the size of the elliptical model of the potential risk is determined. Specifically, the length in the X direction of the elliptical model (the length of a major axis) is defined as (estimated speed u [m/s] of blind spot object 52 bolting out)×(time [s] user's vehicle takes to reach collision position), and is calculated by Equation 4. In this embodiment, the length in the Y direction of the elliptical model (the length of a minor axis) is assumed to be a constant value.

[Equation 4]

Major axis of elliptical model=$T_{self} \times u$ [m] (Equation 4)

As a result, when the blind spot object 52 is estimated as a high-speed moving body, such as a vehicle, the potential risk is expressed as a large elliptical model. When the blind spot object 52 is estimated as a low-speed moving body, such as a pedestrian, in contrast, the potential risk is expressed as a small elliptical model.

At the final step C, the center coordinates of the elliptical model representing the potential risk are determined. Specifically, the X coordinate of the center coordinates of the elliptical model is defined as a coordinate represent in an intersection between a bolting-out position of the blind spot object 52 and a blind spot area boundary, while the Y coordinate of the came is defined as the bolting-out position of the blind spot object 52. The blind spot area boundary is a straight line connecting the user's vehicle to the parked vehicle 1B. A speed of the user's vehicle 1 that prevents the vehicle 1 from coming into contact with the elliptical model of the potential risk is then calculated as a standard speed. Thus, even if a moving body similar to the estimated blind spot object 52 bolts out from the blind spot area 51, a collision with the moving body can be avoided without changing the speed.

Figure 8:
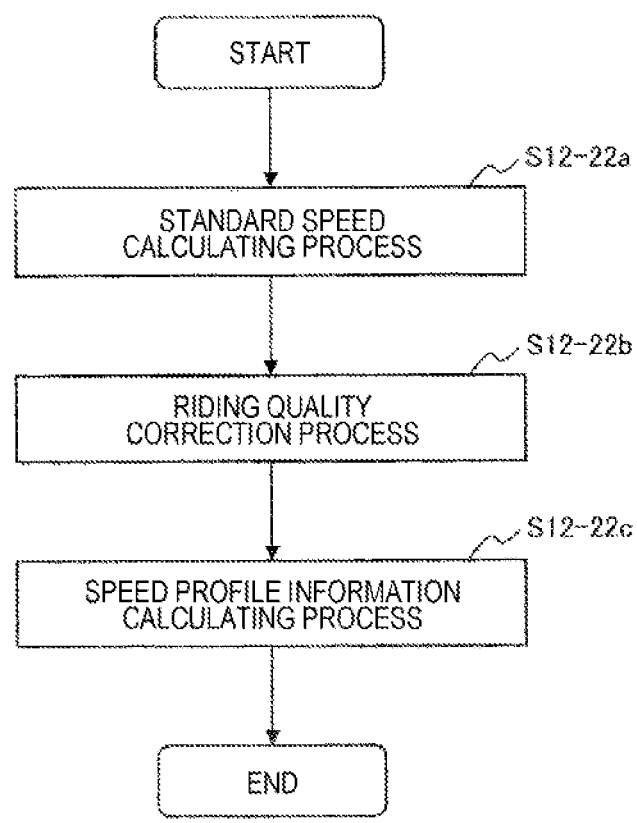
FIG. 8 is a flowchart showing details of a speed candidate generating process.

At step S12-22b of FIG. 8, the vehicle movement control unit 12 carries out speed correction of correcting the calculated standard speed in consideration of a ride quality. This speed correction is carried out to deal with a case where the user's vehicle 1 keeping running at the standard speed needs to avoid a collision by rapid deceleration when a moving body with a speed higher than the speed of the blind spot object 52 bolts out from the blind spot area 51 (e.g., when the blind spot object 52 is estimated as a pedestrian but a moving body actually bolting out is found to be a bicycle), in which case a ride quality widely deteriorates. According to the speed correction, when the user's vehicle passes through the vicinity of the blind spot area 51, the vehicle's speed is reduced to a blind-spot-passing speed lower than the standard speed in advance so that even if a moving body with a speed higher than the speed of the estimated blind spot object 52 bolts out, a degree of rapid deceleration is reduced to suppress a deterioration in the ride quality.

At this step, therefore, the standard speed calculated at step S12-22a is multiplied by a coefficient determined for each type of blind spot object 52 to reduce the standard speed. This allows the user's vehicle to pass through the vicinity of the blind spot area 51 at the proper blind-spot-passing speed set according to the type of the blind spot object 52. It is said in general that a deceleration rate exceeding 0.2 G results in a deterioration in the ride quality. It is therefore desirable that the blind-spot-passing speed be set by the speed correction such that the deceleration rate used for collision avoidance is about 0.2 G or less when a moving body different from the estimated blind spot object 52 bolts out.

Figure 10:
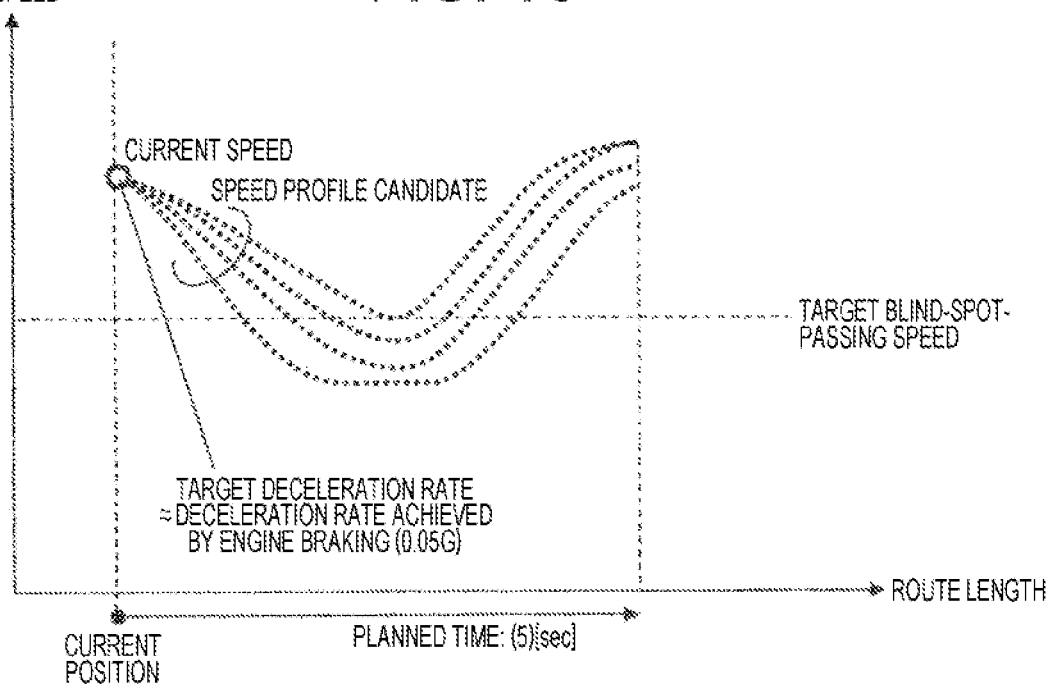
FIG. 10 depicts an example of speed profiles that are calculated based on a blind-spot-passing speed.

Subsequently, at step S12-22c, speed sequence information that satisfies the following Equation 5 is calculated as a candidate for speed profile information. FIG. 10 is a graph showing speed profile candidates calculated at this step. In this manner, a plurality of speed profile candidates are calculated, according to which the current speed is reduced at least to a target blind-spot-passing speed before the user's vehicle passes through the estimated collision position.

[Equation 5]

$$\text{Min.} \int_{t_1}^{t_2} \left[ w_4 \left( \begin{array}{c} \text{Longitudinal acceleration} \\ \text{of user's vehicle} \end{array} \right)^2 + w_5 \left( \begin{array}{c} \text{Horizontal acceleration} \\ \text{of user's vehicle} \end{array} \right)^2 + w_6 (\text{Speed limit-speed of user's vehicle})^2 + w_7 \left( \begin{array}{c} \text{Target deceleration rate for achieving blind-} \\ \text{spot-passing speed-deceleration rate} \end{array} \right)^2 \right] dt$$ (Equation 5)

It is desirable that at deceleration from a cruise speed to the blind-spot-passing speed, the user's vehicle decelerate at a low deceleration rate equivalent to a deceleration rate achieved by an engine brake that arises when the driver turns off the accelerator. This is because that when the user's vehicle decelerates at the deceleration rate equivalent to the deceleration rate achieved by the engine brake during traveling toward the blind spot area 51, the driver is less likely to feel uncomfortable. When the power source of the user's vehicle 1 is not an engine but a motor, the user's vehicle 1 may be caused to decelerate at a gentle deceleration rate equivalent to a deceleration rate achieved by a regenerative brake.

Subsequently, at step S12-3 of FIG. 6, the vehicle movement control unit 12 evaluates track candidates (route candidates and speed candidates) generated at step S12-2. As an evaluation method, for example, a method of evaluating each track candidate from a linear sum of evaluation items of the following Equation 6, the evaluation items indicating a ride quality (e.g., an acceleration acting in the horizontal direction of the vehicle, a longitudinal acceleration acting in the horizontal direction of the vehicle, and a jerk given by differentiating these accelerations). In equation 6, $v_1$, $v_2$, $v_3$, and $v_4$ denote weighting coefficients.

[Equation 6]

Ride quality evaluation value=$v_1$×(horizontal acceleration of user's vehicle)+$v_2$×(longitudinal acceleration of user's vehicle)+$v_3$×(horizontal jerk of user's vehicle)+$v_4$×(longitudinal jerk of user' vehicle) (Equation 6)

Subsequently, at step S12-4, the vehicle movement control unit 12 selects a candidate track that is safe and offering better ride quality, from evaluated track candidates (route candidates and speed candidates), and determined the selected candidate track to be a candidate track to be used for actual traveling. Once the candidate track is determined, to prevent its switching for a given time, an evaluated value obtained at step S12-3 may be weighted for adjustment. This is done to avoid such a case where when a track candidate not involving lane change is adopted in a calculation cycle following adoption of a track candidate involving lane change, the occupant may become anxious about behavior of the user's vehicle 1.

Subsequently, at step S12-5, the vehicle movement control unit 12 sets the track candidate determined at step S12-4 as a target track, and calculates a steering instruction value, an engine output value, and a brake operation amount so that the user's vehicle 1 autonomously travels on the target track. As a method of calculating a steering instruction value for traveling along a target route, for example, a method of determining a steering amount in such a way as to reduce an error with the target path is known. As a method of achieving speed control for traveling at the target speed, a method of calculating an instruction value to the engine or the brake using a known cruise control calculation method may be adopted.

<Specific Control by Vehicle Control Device 10>

Actual speed control that, is carried out by the vehicle control device 10 when the user's vehicle 1 in autonomous driving mode approaches a blind spot area will be described specifically with reference to FIGS. 11A and 11B.

Figure 4:
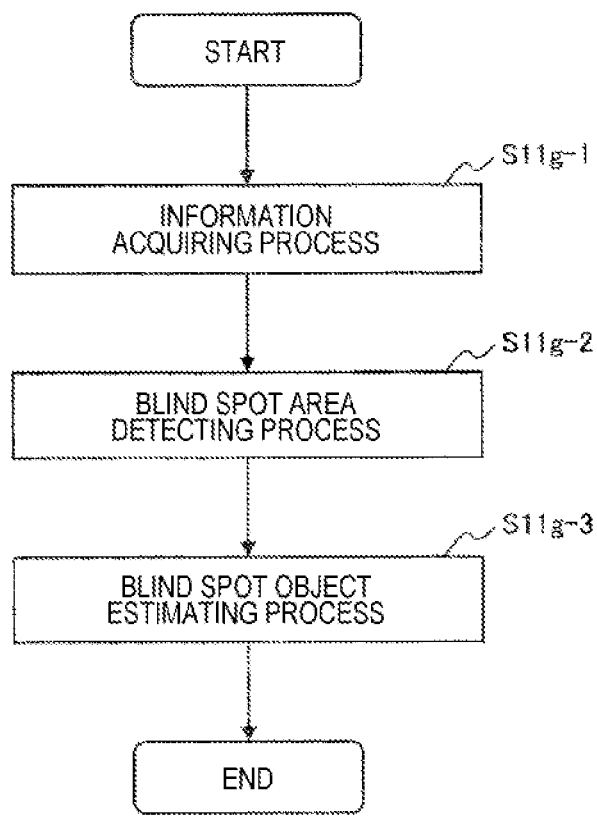
FIG. 4 is a flowchart showing processes executed by a moving body action predicting unit.
Figure 11A:
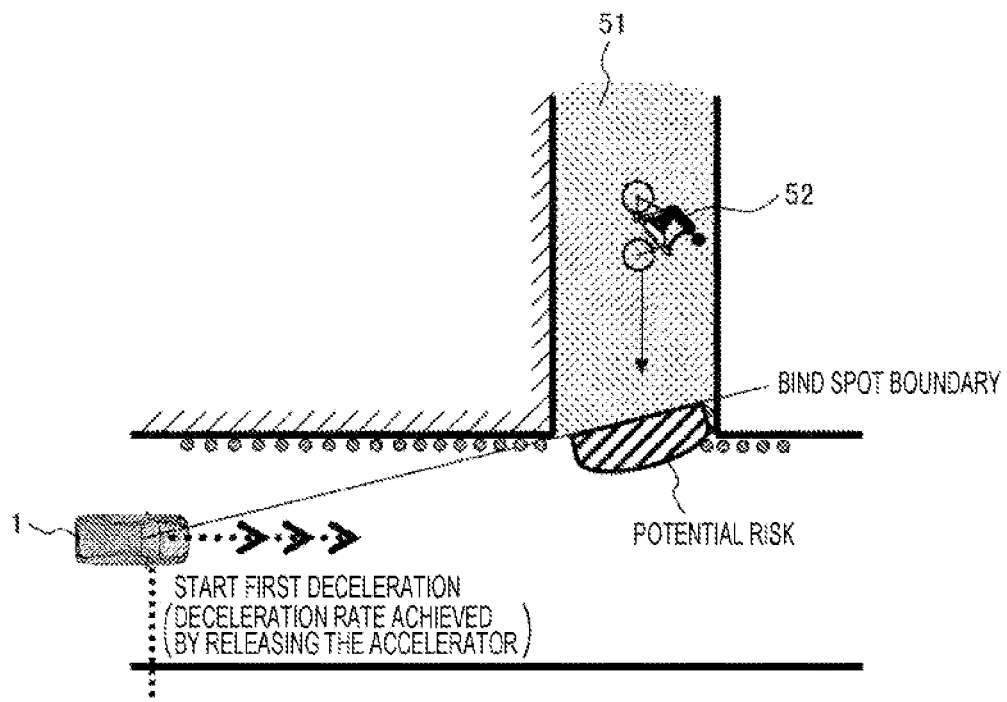
FIG. 11A depicts braking control that is carried out by the vehicle control device when the user's vehicle approaches a blind spot area.

When the user's vehicle 1 in autonomous driving mode approaches the blind spot area 51, at a point of time indicated in FIG. 11A, the vehicle control device 10 estimates the blind spot object 52 as a pedestrian, the blind spot object 52 being a virtual moving body that may bolt out of the blind spot area 51 on the left front side of the user's vehicle 1, through the processes described in FIG. 4 and the like, and creates a small elliptical model on the blind spot boundary, the elliptical model corresponding to the potential risk of the pedestrian's bolting out. In this case, before the user's vehicle reaches the vicinity of the blind spot area 51, the vehicle control device 10 issues an acceleration stop instruction to the acceleration control device 5a to decelerate to the blind-spot-passing speed, which is a relatively high speed but allows the user's vehicle to avoid collision with a low-speed moving body (pedestrian) even if it bolts out, and starts first type deceleration at a gentle deceleration rate by accelerator turn-off.

Figure 11B:
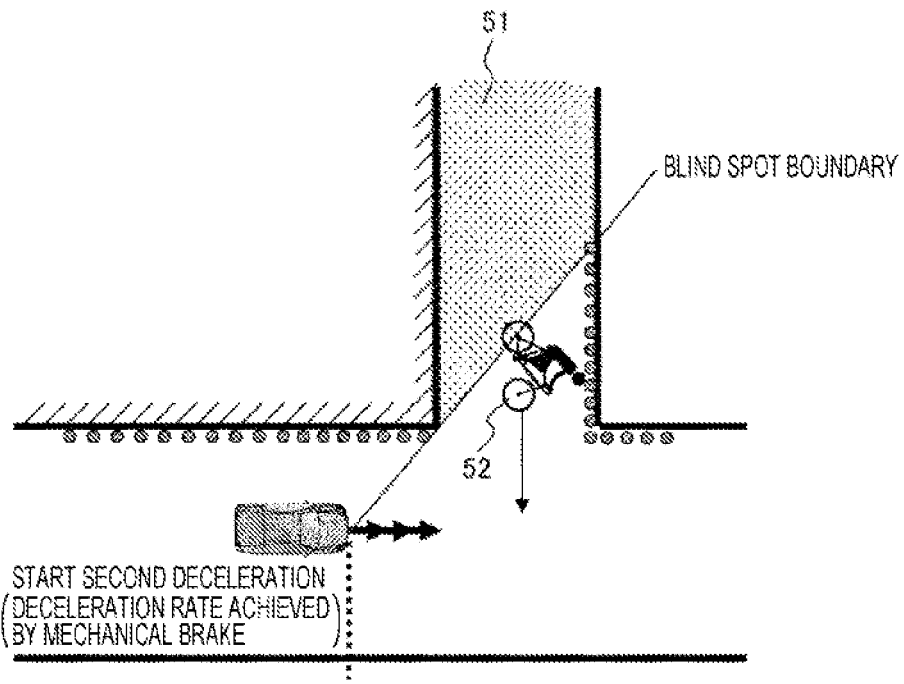
FIG. 11B depicts braking control that, is carried out by the vehicle control device when the user's vehicle approaches the blind spot area.

Thereafter, at a point of time indicated in FIG. 11B, when detecting a bicycle's bolting out, based on output from the sensors 2, the vehicle control device 10 issues a brake instruction to the brake control device 4a to carry out second type deceleration by the mechanical brake so that a collision with a moving body (bicycle) with a speed higher than that of the estimated blind spot object 52 (pedestrian) can be avoided, in this case, because the vehicle has already decelerated to the blind-spot-passing speed to deal with the pedestrian's bolting out before use of the mechanical brake, deceleration by the mechanical brake does not need to be so great, in which case, even if the mechanical brake is operated under control by the vehicle control device 10, the ride quality does not significantly deteriorate.

Comparison between a change in the speed of the user's vehicle 1 in a case where estimation of the type of the blind spot object 52 is correct and a change in the speed of the user's vehicle 1 in a case where the estimation is incorrect will then be described with reference to FIGS. 12A and 12B.

Figure 12A:
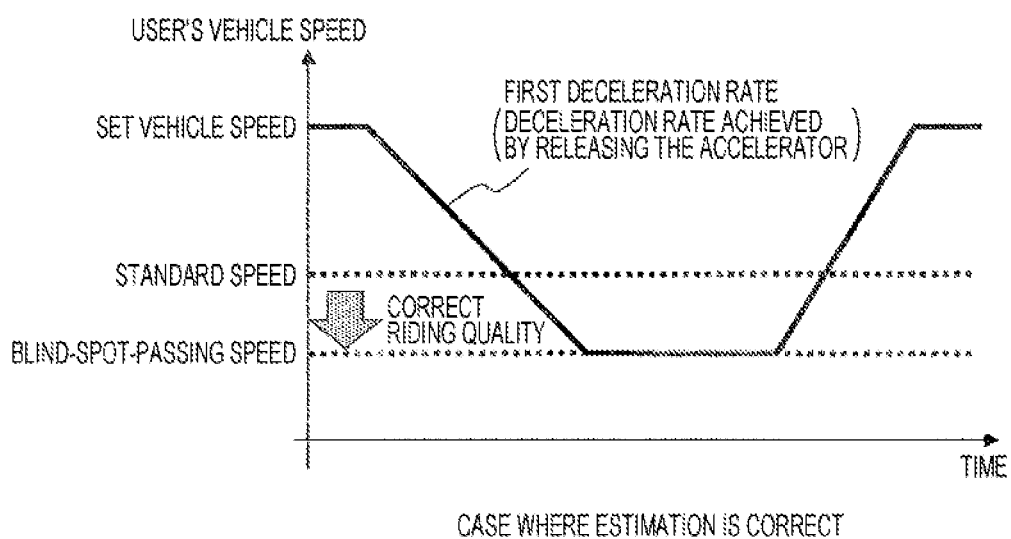
FIG. 12A depicts speed control that is carried out by the user's vehicle when estimation ox a blind spot object is correct.

FIG. 12A is a graph showing a change in the speed of the user's vehicle 1 in a case where estimation of the blind spot object 52 is correct. As shown in FIG. 12A, when approaching the blind spot area 51, the user's vehicle 1 decelerates from a set vehicle speed, which is the cruise speed, to the blind-spot-passing speed lower than the standard speed, at the first type deceleration rate by accelerator turn-off. The blind-spot-passing speed is the speed set according to the estimated type of the blind spot object 52. When the estimation is correct, therefore, even if a moving body of the same type as the blind spot object 52 bolts out from the blind spot area 51, the moving body does not collide with the user's vehicle 1. The user's vehicle 1 is thus allowed to safely pass through the vicinity of the blind spot area 51 while maintaining the blind-spot-passing speed. After passing through the vicinity of the blind spot area 51 while maintaining the blind-spot-passing speed, the user's vehicle 1 accelerates to the set vehicle speed.

Figure 12B:
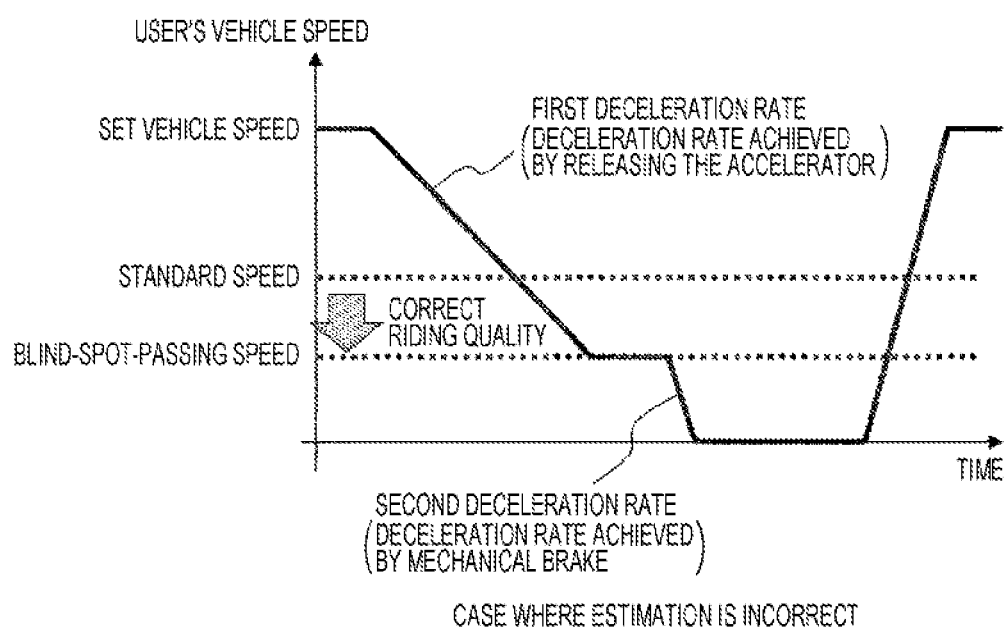
FIG. 12B depicts speed control that is carried out by the user's vehicle when estimation of the blind spot object is incorrect.

FIG. 12B is a graph showing a change in the speed of the user's vehicle 1 in a case where estimation of the blind spot object 52 is incorrect. As shown in FIG. 12B, when approaching the blind spot area 51, the user's vehicle 1 decelerates from the set vehicle speed to the blind-spot-passing speed, at the first type deceleration rate by accelerator turn-off. Then, when finding that the blind spot object 52 having bolted out from the blind spot area 51 is not the estimated one (e.g., although the blind spot object 52 has been estimated as a pedestrian, a bicycle has bolted out.), the user's vehicle 1 decelerates at the second type deceleration rate, using the mechanical brake, to come to a stop, confirms that the blind spot object 52 (bicycle) has moved to a safety area, and then accelerates to the set vehicle speed. As described above, according to this embodiment, the vehicle speed is already reduced to the blind-spot-passing speed according to the result of estimation of the blind spot object 52 before use of the mechanical brake. Because of this, even if a moving body different from the estimated blind spot object 52 bolts out, deceleration by the mechanical brake is not so great. Even if the mechanical brake is operated under control by the vehicle control device 10, therefore, the ride quality does not significantly deteriorate.

As described above, according to the vehicle control device or the vehicle control system of this embodiment, even when the moving body actually bolting out from the blind spot area is different from the estimated blind spot object, autonomous driving control can be carried out in such a way as to make rapid deceleration unnecessary and prevent a deterioration in the ride quality.

The vehicle control device that can avoid collision with a moving body bolting out from a blind spot area has been described above. Situations to which the present invention can be applied, however, are not limited to such a collision case. For example, according to the present invention, the speed of the user's vehicle in autonomous driving mode is controlled by the same processes as described above also in a situation where a parked vehicle might start suddenly or a situation where a door of a parked vehicle might be opened suddenly.

REFERENCE SIGNS LIST 1 user's vehicle
2 sensor
3 steering control mechanism
3a steering control device
3b handle
3c steering torque detecting device
3d steering wheel angle detecting device
3e assist motor
4 brake control mechanism
4a brake control device
4b brake pedal
4c wheel cylinder
4d combine sensor
4e wheel speed sensor
5 accelerator control mechanism
5a acceleration control device
5b accelerator pedal
5c stroke sensor
10 vehicle control device
11 automatic driving planning unit
11a sensor information processing unit
11b storage unit
11c map information processing unit
11d user's vehicle position estimating unit
11e moving body action predicting unit
11f driving action candidate generating unit
11g blind spot object estimating unit
12 vehicle movement control unit
12a traffic lane centerline generating unit
12b track candidate generating unit
12c track evaluating unit
12d target track determining unit
12e track following control instruction value calculating unit
13 actuator control unit
14 in-vehicle network
51 blind spot area
52 blind spot object

The invention claimed is:

1. A control device for a vehicle comprising:
a memory;
a communication interface that is communicatively coupled to a sensor; and
a processor that is communicatively coupled to the memory, wherein the processor is configured to:
detect a blind spot area of the sensor, wherein the sensor recognizes an external environment; and
estimate a blind spot object that is a virtual moving body hidden in the blind spot area, and
when the vehicle approaches the blind spot area:
transmit a first command to a brake control device to decelerate the vehicle at a first rate, and
transmit, in response to a moving body detected by the sensor being different from a type of the blind spot object, a second command to the brake control device to decelerate the vehicle at a second rate, wherein the second rate is faster than the first rate.

2. The control device according to claim 1, wherein the brake control device includes at least one of an engine brake a regenerative brake, or a mechanical brake.

3. The control device according to claim 1, wherein the processor is further configured to:
estimate a type and an action of the blind spot object, based on a feature amount extracted from surrounding environment information or map information.

4. The control device according to claim 2, wherein the processor is further configured to:
estimate a type and an action of the blind spot object, based on a feature amount extracted from surrounding environment information or map information.

5. A control system for a vehicle comprising:
a sensor that recognizes an external environment; and
a processor that is communicatively coupled to the sensor, wherein the processor is configured to:
detect a moving body near the vehicle based on an output from the sensor;
detect a blind spot area that cannot be detected by the sensor, based on output from the sensor;
estimate a blind spot object that is a virtual moving body hidden in a blind spot area adjacent to the vehicle;
generate a blind-spot-passing speed that is a speed with which the vehicle passes through vicinity of the blind spot area; and
transmit an acceleration instruction to an acceleration control device or a brake instruction to a brake control device based on the blind-spot-passing speed, and
when a type of the moving body detected by the sensor is identical with a type of the blind spot object estimated, transmit an additional instruction to the brake control device that causes the vehicle to decelerate from the blind-spot-passing speed in response to a type of the moving body detected being different from a type of the blind spot object estimated.

6. The vehicle control system according to claim 5, wherein the processor is further configured to:
change the blind-spot-passing speed according to a type of the blind spot object estimated.

7. The vehicle control system according to claim 6, wherein
a deceleration rate in a case of further decelerating from the blind-spot-passing speed is less than, 0.2 G.

* * * * *